May 17, 1927.
G. J. JANOSKO
1,628,782
SNOW SHOVEL
Filed April 15, 1926
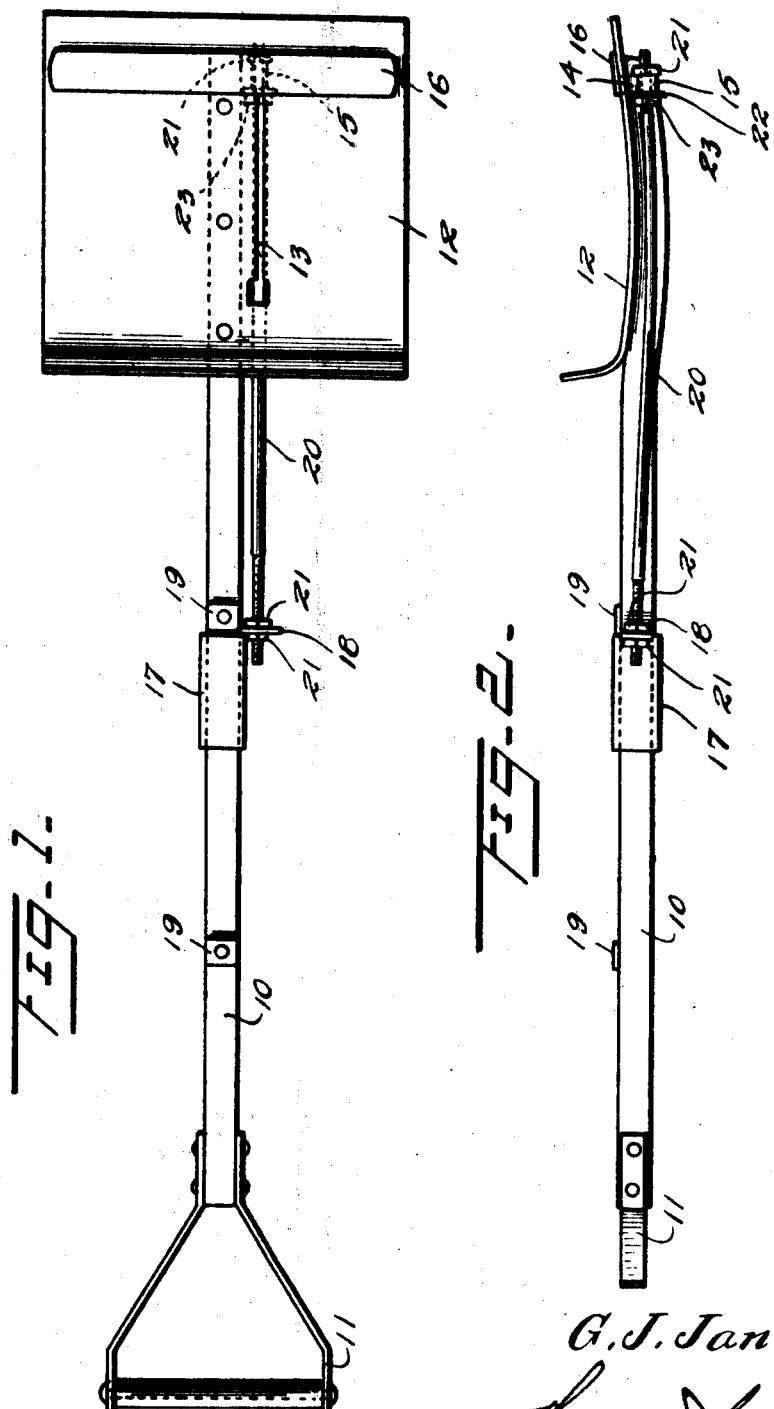
Inventor
G. J. Janosko, Patented May 17, 1927.

1,628,782

UNITED STATES PATENT OFFICE.

GEORGE J. JANOSKO, OF ANACONDA, MONTANA.

SNOW SHOVEL.

Application filed April 15, 1926. Serial No. 102,270.

This invention relates to new and useful improvements in shovels.

One object of the invention is to provide a shovel which is equipped with means for preventing the load from sticking to the blade thereof.

Another object is to provide a device attached to a shovel by means of which the load may be easily and quickly loosened, during the act of swinging the shovel for discharging the load therefrom.

A further object is to provide a device for loosening the load from a shovel blade which is easily operated by one hand of the operator.

Other objects and advantages will be apparent from the following description when taken in connection with the accompanying drawing:

In the drawing:

Figure 1 is a front elevation of a shovel made in accordance with the present invention.

Figure 2 is a side elevation of the same.

Referring particularly to the accompanying drawing, 10 represents the handle bar of the shovel, which may be formed from any suitable material, and has the hand loop, or grip 11, at one end. The other end is slightly curved below the plane of the body of the bar, and secured within the concave portion thereof, is the shovel blade 12. Formed longitudinally in the blade 12, at one side of the adjacent portion of the bar 10, is a slot 13, and disposed through this slot is the stem 14, of the loop or eye 15, said stem carrying on its upper end the transversely extending load loosening knife blade 16, said knife blade being arranged on the upper face of the shovel blade for movement toward and away from the point or working edge of the latter. Slidable on the handle bar 10, at a suitable distance from the upper end of the shovel blade 12, is a ferrule or sleeve 17, from one side of which extends an eye 18, said sleeve being limited in its sliding movements on the bar by the stops 19, secured to the upper face of the bar. Disposed through the before-mentioned eye 15 is the threaded end of a rod 20, which extends upwardly along one side of the handle bar, and has its other threaded end disposed in the eye 18. Nuts 21 are engaged on the threaded ends of the rod 20 whereby to maintain the rod in proper position, and to impart sliding movement to the blade 16, upon sliding movement of the ferrule or sleeve 17 longitudinally of the handle bar. A small angular plate 22 is disposed on the first-mentioned end of the rod 20, rearwardly of the eye 15, and is held in frictional engagement with the rear face of the shovel blade by a nut 23.

In using the shovel, the operator grasps the hand grip 11 with the right hand, and the ferrule 17 with the left hand, at the same time moving the ferrule down against the lower stop 19. The shovel blade is then plunged into the material to secure a load on the blade. As the operator swings, or tosses, the shovel, in the act of discharging the load, the left hand slides the ferrule rearwardly toward the upper stop 19, with the result that the blade 16 is moved beneath the load on the shovel, so that said load is loosened and permitted to properly fall from the shovel. As the operator brings the shovel back into position for another load, the left hand slides the ferrule in the direction of the blade 12, thus positioning the blade 16 near the working edge of the blade 12.

What is claimed is:

1. A snow shovel comprising a handle and a slotted blade, a transverse blade slidable longitudinally on the upper face of the blade and arranged to scrape the said face of the shovel blade beneath a load thereon, a ferrule slidable on the handle, and connections between the ferrule and said transverse blade operating through said slot of the shovel blade.

2. A snow shovel comprising a handle and a blade, the blade having a longitudinal slot therein, a transverse blade disposed flatly on the shovel blade and having an eye disposed through said slot, a ferrule slidable on the handle, and an operating rod connected with the ferrule and with said eye, whereby to move said transverse blade longitudinally between the shovel blade and a load on said blade.

In testimony whereof, I affix my signature.

GEORGE J. JANOSKO.